April 25, 1967 R. J. NADHERNY 3,315,783
ARTICLE CONVEYING APPARATUS
Filed Oct. 21, 1965 4 Sheets-Sheet 2
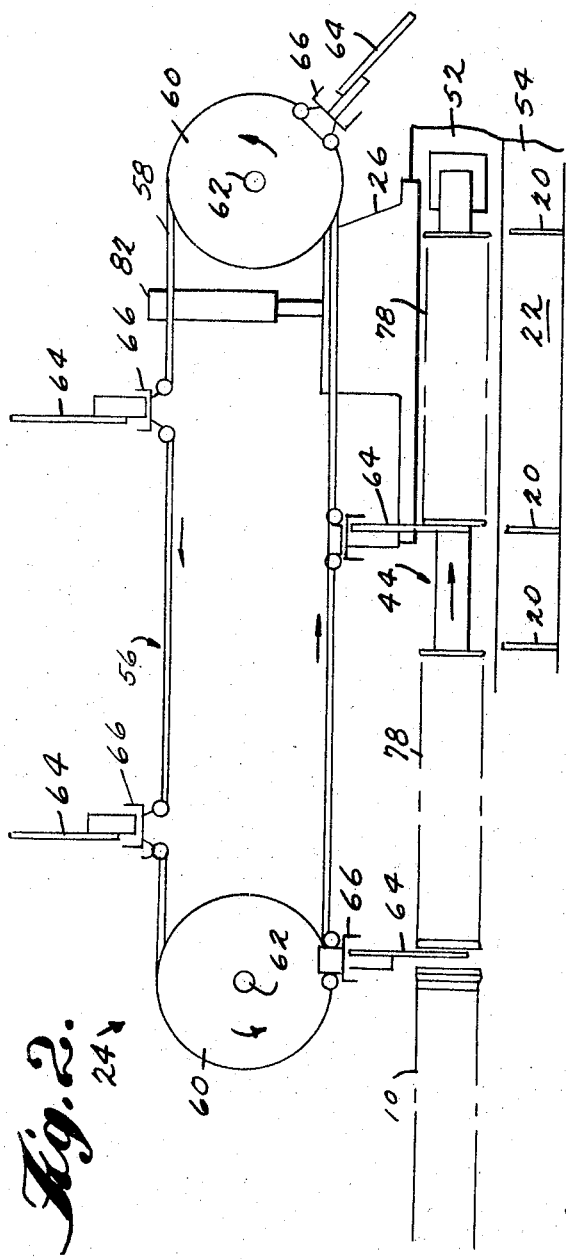
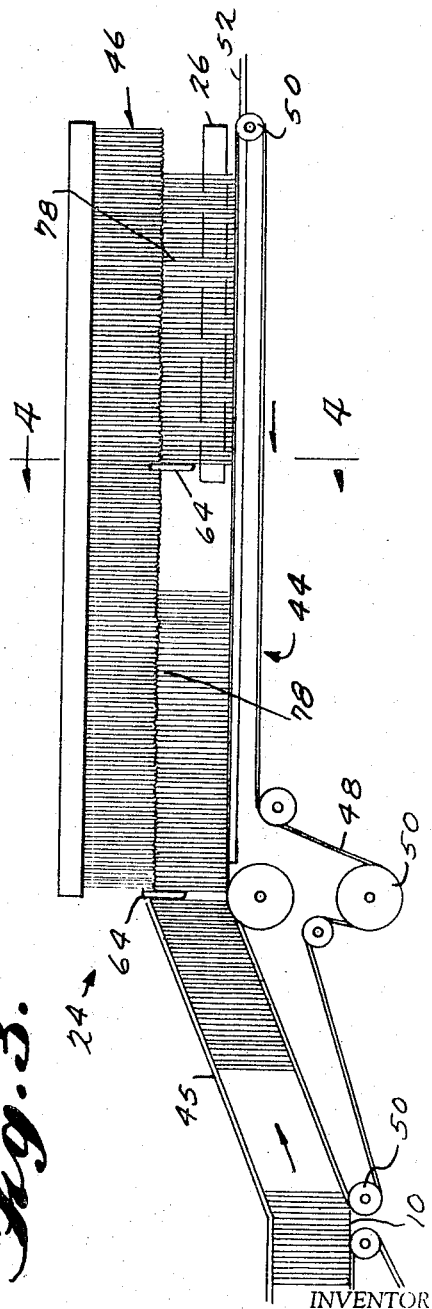
INVENTOR
RUSSELL J. NADHERNY
BY Cushman, Darby & Cushman
ATTORNEYS

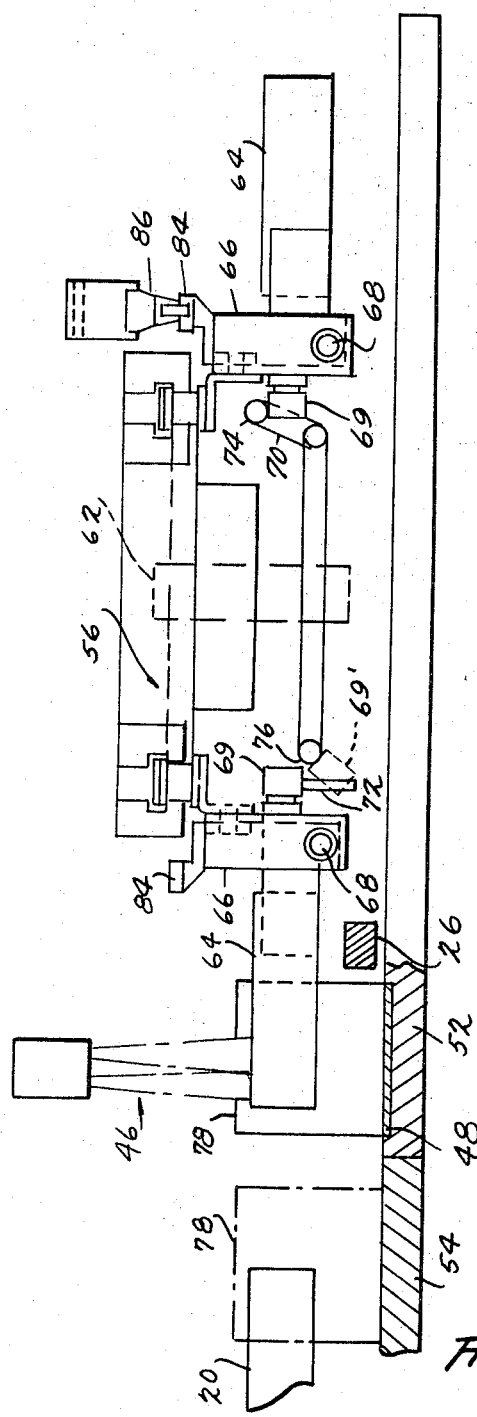

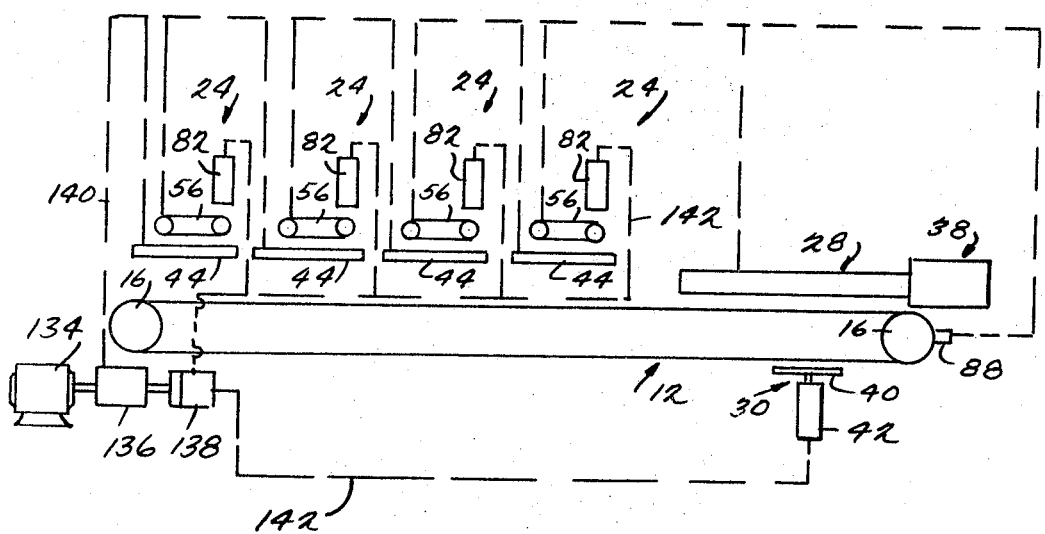

United States Patent Office 3,315,783
Patented Apr. 25, 1967

3,315,783
ARTICLE CONVEYING APPARATUS
Russell J. Nadherny, Glenview, Ill., assignor to The Kroger Co., Cincinnati, Ohio, a corporation of Ohio
Filed Oct. 21, 1965, Ser. No. 499,488
7 Claims. (Cl. 198—32)

This invention relates to the handling and transfer of continuously produced articles, and in particular to equipment for continuously receiving a bulk supply of articles having a panel form such as soda crackers or the like, and continuously separating them into discrete groups for delivery to packaging machinery.

In the commercial production of crackers it is conventional practice to convey a continuous sheet of dough through an oven provided with means for scoring the sheet into individual crackers. The baked sheet emerges from the oven at a relatively low speed and is subsequently cooled and sent to machinery which breaks the sheet into smaller units of crackers or into individual crackers. The units or individual crackers are then transferred in groups to a wrapping or packaging machine. Conventional packaging machines are capable of handling a large number of crackers, for example 50 to 100 groups per minute, each group containing about 40 crackers. If the packing machine is to be employed efficiently by operating it at full capacity, the means employed to prepare the crackers for delivery to the machine must handle the crackers at a high rate and at the same time avoid any appreciable breakage. It has been conventional practice in the past to employ manual labor for gathering the crackers from the breaking operation and removing them to a packaging machine. Mechanical systems have also been suggested for automatically gathering, stacking and feeding the crackers, and one such system is disclosed in Hahn and Nadherny Patent 3,071,236, issued Jan. 1, 1963.

It is the principal object of the present invention to take advantage of the high capacity of packaging machinery by providing an improved apparatus and method for receiving a plurality of advancing columns of panels, such as crackers or the like, segregating the columns into discrete groups of predetermined length and transferring the groups to the packaging machinery in a single rapidly moving line in which the groups are uniformly spaced apart.

It is a more specific object of the invention to provide an apparatus comprising a measuring station associated with each of a plurality of advancing columns of panels, a single high speed receiving conveyor for carrying uniformly spaced groups of panels to a packaging machine and a single variable speed conveyor for accepting panel groups from the measuring stations and conducting them to a transfer station adjacent the high speed receiving conveyor in a special manner which assures that the groups will be uniformly spaced apart when transferred to the high speed conveyor. To this end the measuring stations are disposed in longitudinally spaced relationship along the variable speed conveyor and each advancing column is guided into parallelization with the variable speed conveyor at one of the stations. Then a group of panels is accelerated away from the leading end of each column by means of an endless conveyor having specially constructed flights which sequentially penetrate the column as the conveyor revolves. A transfer mechanism within each measuring station moves the segregated group transversely into a group receiving space on the variable speed conveyor while the latter is driven at the same linear speed as the speed of the accelerated group. The variable speed conveyor is then accelerated to a higher speed thus rapidly moving the panel groups toward the transfer station, where the panel groups are transferred to the high speed receiving conveyor. Following this the variable speed conveyor is decelerated to complete its cycle and to again receive panel groups while moving slowly.

All the measuring stations operate simultaneously and, accordingly, the variable speed conveyor receives as many groups as there are columns during each cycle of conveyor movement. As a result of the spacing between measuring stations and the relative short length of the groups, the simultaneously transferred groups are placed on the variable speed conveyor in locations which are separated from each other by other group receiving spaces. That is, a single operation of the measuring stations does not fill neighboring group receiving spaces on the variable speed conveyor. However, the arrangement of these stations, together with the linear distance which the conveyor advances during each cycle, is such that each group receiving space leaving the forwardmost measuring station will contain a panel group. It will become apparent from the detailed description which follows that the linear advance of the conveyor during each cycle must equal the product of the number of measuring stations (that is, the number of advancing columns) times the distance between centers of adjacent group receiving spaces on the variable speed conveyor. Otherwise, some of the group receiving spaces leaving the forwardmost station will be empty, or one or more of the measuring stations may attempt to fill an already filled space. The spacing between stations, expressed in terms of the distance between centers of adjacent group receiving spaces on the variable speed conveyor, may vary in multiples of that distance, although not all multiples are operable. It will be apparent to those skilled in the art, after reading the following detailed description, which station-to-station distances will result in a properly filled conveyor.

The transfer station, which is disposed forwardly of the forwardmost measuring station, operates when the linear speed of the variable speed conveyor equals the linear speed of the high speed receiving conveyor. This station includes a transfer mechanism which simultaneously moves a plurality of adjacent panel groups transversely away from the variable speed conveyor and on to the receiving conveyor. In order that the rate of panel discharge equal the rate at which panels are placed on the variable speed conveyor at the measuring stations, the number of panel groups transferred at each operation of the transfer mechanism equals the number of measuring stations. The uniform spacing which was effected between the groups carried by the variable speed conveyor is maintained on the receiving conveyor by virtue of the sequential action of the transfer mechanism together with the equal speeds of two conveyors at the moment of the transfer now under discussion.

The invention will be further understood from the following detailed description of a practical embodiment in conjunction with the drawings in which:

FIGURE 1 is a schematic top plan view of an installation embodying and illustrating the principles of the present invention;

FIGURE 2 is a schematic top plan view, on an enlarged scale, of one of the measuring stations of FIGURE 1;

FIGURE 3 is a schematic side elevational view of the measuring station of FIGURE 2;

FIGURE 4 is a sectional view taken generally along the line 4—4 of FIGURE 3;

FIGURE 5 is an elevational view of the drive system for the variable speed conveyor of FIGURE 1;

FIGURE 6 is a diagram illustrating the manner of loading the variable speed conveyor of FIGURE 1; and FIGURE 7 is a schematic view illustrating a speed control and synchronization arrangement for the system of FIGURE 1.

Referring to FIGURE 1 there is schematically shown in top plan view an installation for processing four continuously advancing columns 10 of shingled crackers. The columns 10 may be obtained in any suitable manner, as from the type of breaking and shingling machinery disclosed in the aforementioned Hahn and Nadherny Patent 3,071,236. For example, the four columns 10 may be derived from a continuously baked sheet of crackers, sixteen crackers wide, by breaking the sheet into individual crackers and guiding and shingling the individual crackers into sixteen columns. The sixteen columns may be separated into groups of four, and each group of four may then be advanced to a separate installation of the kind shown in FIGURE 1.

The installation of FIGURE 1 includes a variable speed conveyor 12 in the form of an endless chain 14 looped over horizontally spaced apart sprockets 16 carried on vertical shafts 18. The chain 14 carries a plurality of outwardly projecting flights 20 which are arranged in longitudinally spaced apart pairs, the members of each pair defining a cracker group receiving space 22. A variable speed drive (not shown in FIGURE 1) is provided for revolving the chain 14 alternately at a low speed and a high speed.

Four measuring stations 24, operable in unison, are disposed in uniformly spaced apart relationship along one run of the variable speed conveyor 12. Each station 24 serves to segregate a group of crackers from one of the columns, to accelerate the segregated group and to move the segregated group into a group receiving space 22 on the variable speed conveyor 12. To this end the drive for the variable speed conveyor 12 is adapted to advance the latter at a linear speed equal to the accelerated speed of the segregated cracker group during part of the advancing cycle. At this time a pusher plate 26 (FIGURES 2 and 3) forming part of the measuring station 24 moves the segregated group into one of the spaces 22 on the variable speed conveyor 12.

At the forwardmost, or discharge end, of the variable speed conveyor 12 there is arranged a high speed receiving conveyor 28 and a transfer station 30. The receiving conveyor 28 is disposed alongside and parallel to the variable speed conveyor 12 and includes an endless chain 32 looped over sprockets (not shown) which are rotatable in vertical planes. The chain 32 carries spaced apart flights 34 which are spaced apart in the same arrangement as the flights 20 and which project upwardly through a slot in a stationary horizontal plate 36. The forward end of the receiving conveyor 28 is associated with a wrapping machine 38 which may be of conventional design. A suitable machine is a Hudson-Sharp wrapper which is capable of wrapping up to about 100 cracker groups per minute. Transfer of cracker groups, four at a time, from the variable speed conveyor 12 to the receiving conveyor 28 is accomplished with a pusher plate 40 within the transfer station 30, the plate 40 being reciprocally movable in a direction transverse to the conveyors 12 and 28 as by means of a double acting pneumatic ram 42. The plate moves under chain 42, and the flight 20 thereon, but at a level where its forward end 43 will engage the crackers being conveyed.

FIGURES 2, 3 and 4 show in more detail the construction and arrangement of the parts of one of the measuring stations 24. The advancing column of crackers 10 enters below the station 24 and is there transferred to the upper run of a measuring conveyor 44 which carries the crackers upwardly and then horizontally while at the same time bringing them into parallel relationship with the variable speed conveyor 12. A thin flat spring 45 is fixed above and parallel to the inclined conveyor portion for lightly engaging the tops of the crackers to hold them in alignment. A fixed, downwardly facing brush 46 is arranged above and parallel to the horizontal portion of the measuring conveyor 44 so as to engage the tops of the crackers. As seen in FIGURE 3, the measuring conveyor 44 may be constructed as an endless belt 48 looped over a series of rollers 50 which are mounted for rotation about horizontal axes. The upper run of the belt 48 runs also flush with, but slightly above, a fixed horizontal plate 52. An adjacent plate 54 coplanar with the plate 52 is disposed below the level of the flights 20 on the variable speed conveyor 12.

On the opposite side of the measuring conveyor 44 from the variable speed conveyor 12 is an accelerating conveyor 56 in the form of an endless chain 58 looped over spaced sprockets 60 carried on vertical shafts 62. The chain 58 carries five outwardly projecting equispaced flights 64 which are connected to the chain 58 by channel-shaped brackets 66. The flights 64 are pivoted intermediate their ends to the brackets at 68 so as to be rotatable in vertical planes. The space between adjacent flights 64 is equal to the desired length of the cracker groups to be formed plus the desired spacing between adjacent groups. This is identical to the distance between centers of the group receiving spaces 22 on the variable speed conveyor 12, because the flights 20 on the latter are arranged to receive the cracker groups formed by the accelerating conveyor 56.

The inner ends 69 of the flights 64 on the accelerating conveyor 56 are engageable with either of two fixed cams 70 and 72 so as to be pivoted alternately upwardly and then downwardly during operation of the conveyor 56. Specifically, each flight 64 is cammed downwardly into the cracker column 10, as shown in FIGURE 4, just as the flight 64 reaches the point where the incoming crackers assume a horizontal position on the measuring conveyor 44. This latter position is shown in FIGURES 2 and 3. Subsequently, the flight 64 is cammed upwardly so as to assume a position from which it can again move downwardly. As shown in FIGURE 4, the cam 70 is a rod disposed inwardly of and below the chain 58 and arranged with its leading end 74 above the level of its trailing end 76. The inner end 69 of each flight 64 slides along the lower surface of the rod during operation of the conveyor 56 and becomes depressed to the dotted line position 69' (FIGURE 4) as it approaches the trailing end 76. The outer end of the flight 64 thereby becomes elevated above the level of incoming crackers. The cam 72 is disposed adjacent the trailing end of the cam 70 and is shaped so as to rapidly force the inner end of the flight 64 in an upward direction. This action pivots the flight 64 into the advancing column 10 of crackers at the point where the latter becomes horizontal, as already described. The accelerating conveyor 56 operates at a constant linear speed which is higher than the linear speed of the measuring conveyor 44. As a result of this difference in speed the flight 64 which enters the cracker column 10 immediately segregates a group 78 of crackers and accelerates the group 78 along the path of conveyor 44, i.e. away from the remainder of the column 10.

Referring again to FIGURES 2 and 3 it will be seen that each measuring station also includes the pusher plate 26 disposed at the forward end of the station and mounted for movement transversely to the conveyors 12 and 56. The pusher plate 26 is supported slightly above the fixed horizontal plate 52 and below the accelerating conveyor 56 so as to engage the side of a cracker group 78 near the lower face of the group. A suitable reciprocating drive, such as a double acting pneumatic ram 82, is provided for reciprocating the pusher across the line of travel of the conveyors 12 and 56 so as to push a cracker group 78 off the conveyor 44 and into one of the group receiving spaces 22 on the conveyor 12. This action occurs at a time when the variable speed conveyor 12 is being driven at the same linear speed as the accelerating conveyor 56. The ram 82 may be actuated in any suitable manner as by sequential contact of a projection 84 on the flights 64 with a fixed valve actuator 86 which supplies air to the pneumatic ram 82 by conventional means not shown.

FIGURE 5 illustrates a suitable fast-slow drive 88 for the variable speed conveyor 12. The drive 88 includes a pair of vertically disposed gear wheels 90 and 92 mounted for rotation about horizontal axes 94 and 96, respectively. The wheels 90 and 92 are disposed between two spaced apart beams, one of which is shown at 98, by means of bearings 100 fixed to the beams 98. A gear sequence consisting of four identical small gears 102, 104, 106 and 108 drivingly connects the two wheels 90 and 92 to transmit power from a gear box 110 through the wheel 90 and gear sequence to the wheel 92. Power from the latter is transmitted through a gear box 112 to a vertical rotatable shaft 114 which is axially connected to one of the shafts 18 of the variable speed conveyor 12.

The gears 102, 104, 106 and 108 are mounted for rotation about parallel horizontal axles within a cage 116 which includes two horizontally spaced apart plates, one of which is seen at 118, and suitable spacing members (not shown). The cage 116 is supported above the wheels 90 and 92 in a position such that the small gears 102 and 108 mesh with the wheels 90 and 92, respectively. The means for supporting the cage 116 include four links, two of which are shown at 120 and 122. The link 120 and an identical link on the other side of the cage are pivotably connected at their opposite ends to the axis of rotation of the gear 102 and the axis of rotation of the wheel 90. The link 122 and an identical link on the other side are pivotally connected at their opposite ends to the axis of rotatioon of the gear 108 and the axis of rotation of the gear 92.

The drive 88 additionally includes a reciprocating drive arm 124 pivoted at one end to the axis of rotation of the gear 108 and at its other end to a crank arm 126. The inner end of the crank arm 126 is fixed to the axle of the wheel 90, as by means of a key 128.

*Operation*

In considering the operation of the system described above it will be helpful to bear in mind that three relative cracker speeds are involved—a slow speed imparted by the measuring conveyor 44, an intermediate speed imparted by the accelerating conveyor 56 (and maintained by the variable speed conveyor 12 when operating at its lower speed) and a high speed imparted by high speed operation of the variable speed conveyor 56 (and maintained by the receiving conveyor 28). Stated somewhat differently, two important changes in the speed of the crackers occur between the time of contact with the measuring conveyor 44 and the time of discharge to the receiving conveyor 28. The first speed change is effected by means of the accelerating conveyor 56 whose flights 64 sequentially enter the advancing cracker column 10 and accelerate a group 78 up to the low speed of the variable speed conveyor. The second change in speed occurs as a result of the acceleration of the variable speed conveyor 12 by the fast-slow drive 88. As will be apparent from the following description each cracker group 78 will remain on the variable speed conveyor 12 long enough to undergo several accelerations and decelerations, but these additional speed changes need not be considered at this point.

Referring more specifically to the entry of the crackers into the system it will be seen from FIGURES 1 and 3 that a column 10 of crackers approaches each measuring station 24 from below and is there transferred to the upper run of the measuring conveyor 44 which extends parallel to the variable speed conveyor 12. The crackers first travel along an inclined portion of the measuring conveyor 44 thus being raised to the level of the variable speed conveyor 56 and then along a horizontal portion. As described previously, one of the horizontally traveling flights 64 of the accelerating conveyor 56 is periodically cammed downwardly into the cracker column 10 at the point where the measuring conveyor 44 becomes horizontal. Since the accelerating conveyor 56 operates at a somewhat higher speed than the measuring conveyor 44, the flight 64 rapidly pushes a cracker group 78 away from the leading end of the advancing column 10 in the direction of travel of the column 10. The rapid pushing movement of the flight 64 together with engagement of the bristles of the fixed brush 46 with the upper edges of the crackers in the group 78 assures that each cracker is held erect and in close contact with the adjacent crackers.

It is inherent in the accelerating operation that each group 78 will be spaced from its neighbor. The length of the space between adjacent groups 78 and the length of the groups 78 will depend on the speed of the flights 64 relative to the measuring conveyor 44 and on the distance between flights 64. The number of crackers in each group 78 will depend, of course, on the thickness of the crackers and will vary somewhat from group to group because of variations in cracker thickness. In the present embodiment each group 78 contains from 38 to 42 crackers.

Referring again to FIGURE 2 it will be seen that the variable speed conveyor 12 is operated so that a group receiving space 22 between its flights 20 is brought opposite each cracker group 78 arriving at the pusher plate 26. At the position shown in FIGURES 2, 3 and 4 the pusher plate is about to be moved into engagement with the forwardmost group 78 and transfer it off the measuring conveyor and into the space 22 where it will be engaged by two of the flights 20. As already described, actuation of the pneumatic ram 82 for reciprocating the pusher plate 26 is initiated by contact between one of the flights 64 with a valve actuator 86 (FIGURE 4). In the illustrated embodiment the transfer operation is accomplished in about ⅕ second.

Immediately following the entry of a group 78 into a space 22 the drive 88 accelerates the variable speed conveyor 12 to a relatively high speed in order to advance the loaded spaces 22 toward the transfer station 30. At a time when the speed of the variable speed conveyor 12 equals the speed of the receiving conveyor 28 and when the flights 20 and 34 are in alignment with each other, the ram 42 is actuated to reciprocate the pusher plate 40 once across the line of travel of the variable speed conveyor. During this operation the plate 40 engages four cracker groups 78 and transfers them simultaneously in about ⅕ second, on to the receiving conveyor 28 which transports them at constant high speed to the wrapping machine 38.

Referring more specifically to the operation of the variable speed conveyor 12 the drive 88 is arranged to transmit its slowest speed at the time of movement of cracker groups 78 on to the conveyor 12 and then to transmit its highest speed before the operation of the transfer station 30. Transfer of groups to the receiving conveyor 28 therefore occurs at a time of deceleration of the variable speed conveyor 12, although the transfer can be effected at the time of maximum speed. From a consideration of FIGURE 5 it will be seen that the changes in speed occur automatically as the gear cage 116 reciprocates back and forth over the tops of the gear wheels 90 and 92. The wheel 92 is driven continuously in the same direction by virtue of the continuous meshing of the small gears with each other and with the wheels 90 and 92. The direction and speed of movement of the cage 116 will determine the final speed of the wheel 92. At each speed reversal there is a period of about ½ second during which the output speed is substantially constant. While the illustrated drive 88 achieves the desired speed changes in an efficient manner, it is not a critical part of the present invention and other fast-slow drives may be employed.

FIGURE 6 illustrates in diagrammatical form the manner in which the four measuring stations 24 operate to assure that each space 22 leaving the forwardmost station is occupied with a cracker group 78. Assuming that the variable speed conveyor 12 has just been placed in operation in an empty condition and is moving at slow speed at the end of its first cycle of operation, it will be seen that the four measuring stations 24 simultaneously fill four spaces 22 labeled (a), (b), (c) and (d), each of which is separated from its neighbor by two empty spaces 22.

The conveyor 12 then accelerates and slows down again to receive four more groups 78 at the end of the second cycle of operation. More precisely, the conveyor advances during the second cycle a distance equal to four times the distance between centers of two adjacent spaces 22. That is, the conveyor 12 advances a distance equal to the length of four groups 78 plus the spacing between those groups. This carries each group 78 to a position which is one space beyond the next measuring station 24. Thus, in the second line of FIGURE 6 group (a) has advanced from the rearmost station 24 one space beyond the next station, and the other groups (b), (c) and (d) have advanced a similar distance. Upon operation of the stations four more spaces 22 become filled.

The third line of FIGURE 6 illustrates the position of the conveyor 12 when it slows down at the end of the third cycle to receive a third series of four groups 78. It will be seen that in this position the remaining space 22 between group (a) and group (b) becomes filled by the forwardmost station 24.

The bottom line in FIGURE 6 illustrates the end of the fourth cycle at which time the four groups from group (a) through group (b) are disposed near but not yet opposite the pusher plate 40. Early in the beginning of the fifth cycle, during fast movement of the conveyor 12, the groups (a) through (b) will move into alignment with pusher plate 40 at which time they will be transferred off the conveyor 12. Thereafter, all the spaces 22 reaching the pusher plate 40 will be filled, and sequential action of the plate 40 will always deposit four groups 78 on the receiving conveyor 28. The speed and synchronization of the operation is such that the space between each lot of four groups 78 on the receiving conveyor 28 equals the space between adjacent groups in the lot. The result is that the groups on the receiving conveyor 28 are uniformly spaced apart. Considering the four groups in the lot extending from (a) through (b) it will also be seen that each group has been transferred by a different measuring station 24.

It will be observed that the first four cycles of an empty conveyor 12 will advance empty spaces 22 to the pusher plate 40. In practice this may be avoided by first hand-filling those spaces which would otherwise be left unoccupied. Of course, if the pusher plate 40 is more remote from the forwardmost measuring station 24 than is shown in FIGURE 6, more than four cycles would be required to bring full spaces to the pusher plate, even though all spaces leaving the forwardmost station 24 are filled. It will usually be desirable, from the standpoint of space savings, to locate the pusher plate 40 as near as practicable to the measuring stations, but this is not an essential feature of the invention.

As pointed out heretofore, the linear advance of the conveyor 12 during the period between operation of the measuring stations 24 is equal to the product of the distance between centers of adjacent spaces 22 times the number of measuring stations. This relationship is necessary in order to avoid aligning an already occupied space 22 with a measuring station and to avoid advancing a space 22 in such a manner that it never becomes occupied. The centers spacing between stations 24 in the illustrated embodiment is equal to three center-to-center distances, but this spacing can be varied. For example, the system will operate satisfactorily with spacings equal to two and five center-to-center distances, but not with six center-to-center distances. Other operable spacings will be apparent to those skilled in the art.

It will be understood that the above described function of the various conveyors and pusher plates requires precise control of speed and precise synchronization of the operations. The speeds of the measuring conveyor 44, the accelerating conveyor 56, the variable speed conveyor 12 and the receiving conveyor 28 may be synchronized, for example, by employing a single power source and driving each conveyor through suitably adjusted gear reduction units and chain drives. The sequential operation of the pusher plates 26 and 40 may be obtained by mechanical actuation directly from the power driven equipment, as in the actuation of the ram 82 through contact between the valve actuator 86. Alternatively, the sequential operation of the rams 82 and 42 may be obtained by a suitable timing device.

FIGURE 7 illustrates in schematic form a drive and synchronizing arrangement in which a single power source, such as a motor 134, is employed to drive a primary gear reduction unit 136 and a master timing device 138. Each of the conveyors 12, 28, 44 and 56 is chain-driven by the unit 136 through suitable drive shafts, gear boxes, sprockets and chains, all of which are indicated by the dashed lines 140. Once the desired conveyor speeds and alignments of the various conveyor flights have been obtained by suitable adjustments the drive system will operate satisfactorily without additional control. Sequential reciprocal action of the rams 42 and 82 is obtained by suitable electrical or mechanical connections, illustrated by the dashed lines 142, between the rams and the timer 138.

While the illustrated embodiment has been described as a machine for handling soda crackers, it is to be understood that the machine is equally well adapted to handle other bakery products of a frangible nature, such as cookies, and to handle less frangible articles, such as floor tiles, shingles and candy bars. It is to be understood, also, that the described embodiment is illustrative of the principles of the invention and that various changes and rearrangements of the details shown may be made without departing from the scope of the invention, the scope of which is defined by the appended claims.

What is claimed is:

1. Apparatus for receiving a plurality of continuous columns of shingled panels, such as crackers, advancing at a relatively low speed, and for consolidating the panels into a single line consisting of longitudinally aligned equally spaced groups having a predetermined length traveling at a relatively high speed, the high speed being more than the multiple of the number of continuous columns times the speed of advance of each column, comprising:

a variable speed conveyor means having equally spaced apart positions thereon for receiving groups of panels;

means for sequentially advancing said variable speed conveyor means at a relatively low rate of speed hereinafter from an intermediate speed which is greater than the speed of advance of the continuous columns and then at the aforesaid relatively higher rate of speed, said means being so arranged that each sequence advances the conveyor a linear distance equal to the multiple of the number of continuous columns times the distance between centers of said spaced apart positions;

accelerating conveyor means associated with each continuous column for segregating a group of predetermined length from the leading end of said column and accelerating the movement of said group to advance it to a transfer position wherein the group is juxtaposed to, and extends parallel to, the variable speed conveyor and is moving at the intermediate speed of the variable speed conveyor;

a first transfer means associated with each accelerating conveyor to transfer the said group to one of the said positions on the said variable speed conveyor at a time when the variable speed conveyor is moving at the intermediate speed, said transfer means being so spaced from one another that each will serve groups to positions on the variable speed conveyor that are not already occupied by a group;

a receiving conveyor advancing at the aforesaid high speed, said receiving conveyor having portions juxtaposed to, and extending parallel to, portions of the variable speed conveyor located in advance of the forwardmost first transfer means;

a second transfer means associated with said variable speed conveyor and operable at a time when the variable speed conveyor is operating at the aforesaid high speed to simultaneously transfer a plurality of spaced groups to said receiving conveyor, the number of groups being transferred being equal to the number of columns.

2. Apparatus as in claim 1 wherein each of said first transfer means includes a pusher element disposed at each transfer position for reciprocating movement transverse to the line of travel of the panel group at each transfer position, and means for moving said pusher element into engagement with the panel group at each transfer position so as to transfer the group from the accelerating conveyor to the variable speed conveyor.

3. Apparatus as in claim 1 wherein each of said accelerating conveyors includes a revolvable flexible endless member carrying a plurality of outwardly projecting flights, said flights being arranged in longitudinally spaced apart pairs, the spacing between pairs corresponding to the space between the panel receiving positions on said variable speed conyeyor and the spacing between the members of each pair being equal to said predetermined length of said panel groups.

4. Apparatus as in claim 3 wherein said variable speed conveyor includes a revolvable flexible endless member carrying a plurality of outwardly projecting flights, said flights being arranged in longitudinally spaced apart relationship and defining said panel group receiving positions.

5. Apparatus as in claim 3 wherein the accelerating conveyor flights are pivotably mounted relative to their respective endless members for movement transversely into and out of the line of travel of said flights, said accelerating means further including means for sequentially pivoting each flight into said line of travel so as to enter the column of panels and segregate a group therefrom and for subsequently pivoting each flight in sequence out of said line of travel.

6. Apparatus for receiving a plurality of continuous columns of shingled panels, such as crackers, advancing at a relatively low speed and for consolidating the panels into longitudinally aligned equally spaced groups having a predetermined length and traveling at a relatively high speed, the high speed being more than the multiple of the number of continuous columns times the speed of advance of each column, comprising:

a variable speed conveyor including a revolvable flexible endless member carrying a plurality of outwardly projecting flights, said flights being arranged in longitudinally spaced apart pairs, the spacing between the members of each pair defining a panel group receiving space and corresponding to the length of the panel groups;

means for sequentially advancing said variable speed conveyor means at an intermediate speed which is greater than the speed of advance of the continuous columns and then at said relatively higher rate of speed, said advancing means being arranged and constructed so that each sequence advances the endless member a linear distance equal to the multiple of the number of continuous columns times the distance between centers of said panel receiving spaces on said variable speed conveyor;

accelerating conveyor means associated with each continuous column for segregating a group of predetermined length from the leading end of the respective column and for accelerating the movement of the segregated group to a transfer position wherein the group is juxtaposed to and extends parallel to the variable speed conveyor means and is moving at the intermediate speed of the variable speed conveyor, said accelerating conveyor including a revolvable endless flexible member carrying a plurality of outwardly projecting flights, said flights being arranged in spaced apart pairs corresponding to the flights on said variable speed conveyor, the endless member of said accelerating conveyor being parallel to the endless member of said variable speed conveyor at said transfer position;

first transfer means operable at a time when the variable speed conveyor is moving at the intermediate speed for periodically transferring a group from each accelerating conveyor and for filling all said panel receiving spaces on said variable speed conveyor, said means including a pusher element associated with each column and movable transversely to said endless members to transfer the group at said transfer position to one of the panel receiving spaces on the variable speed conveyor, said pusher elements being so spaced from one another that each will move a group into an unoccupied space on the variable speed conveyor;

a receiving conveyor advancing at said high speed and having a portion juxtaposed to and parallel to a portion of the variable speed conveyor located in advance of the forwardmost first transfer means;

a second transfer means associated with the parallel portions of said variable speed conveyor and said receiving conveyor, said second transfer means including a pusher element movable transversely to said parallel portions to transfer a plurality of adjacent groups, equal in number to the number of columns, from the variable speed conveyor to the receiving conveyor at a time when the variable speed conveyor is operating at said high speed.

7. A method of consolidating and rearranging a plurality of columns of shingled panels, such as crackers, each column continuously moving longitudinally of itself at slow speed into discrete spaced apart groups of panels moving continuously along a single predetermined line of travel at a higher speed comprising: directing each of said moving columns into parallelization with a common line of travel at a different location; separating a discrete group of panels away from the forward end of each column in the direction of movement by accelerating the groups to an intermediate speed; moving all said discrete groups of panels simultaneously laterally out of the line of travel of each column into longitudinally spaced apart relationship along said common line of travel while maintaining movement of said groups in said longitudinal direction at said intermediate speed; accelerating all the groups in said common line of travel to said high speed; simultaneously moving a number of said groups, equal to the number of columns, out of said common line of travel into longitudinally spaced apart relationship along said single predetermined line of travel while all said groups are moving at said greater rate; and decelerating the groups remaining in said common line of travel preparatory to receiving additional distance groups of panels from said columns.

References Cited by the Examiner

UNITED STATES PATENTS

| | | | |
|---|---|---|---|
| 3,071,236 | 1/1963 | Hahn et al. | 198—32 |
| 3,190,434 | 6/1965 | Dardaine | 198—76 X |

EVON C. BLUNK, *Primary Examiner.*

A. C. HODGSON, *Assistant Examiner.*